Patented Mar. 24, 1931

1,797,806

UNITED STATES PATENT OFFICE

MOTOMU SUGATA, OF MINAMI KATSUSHIKA GUN TOKYO FU, JAPAN

METHOD OF MANUFACTURING CELLULOID SUBSTITUTE

No Drawing. Application filed May 23, 1930, Serial No. 455,148, and in Japan January 11, 1930.

This invention relates to a method of manufacturing celluloid substitute, characterized by adding camphor to rosin, heating the mixture in a closed vessel to fuse it into a sticky matter; mixing same with the product obtained by boiling floss-silk, other silk or like fibre in dilute alkali solution so as to swell and glutinize it, suspending the same homogeneously in alcohol or ether and mixing it intimately with magnesium carbonate or magnesium oxide; and then heating and kneading the mixture. The object thereof is to obtain by simple means celluloid substitute of excellent quality which has great lustre, elasticity and transparency and becomes soft when heated, to be easily molded and also is not so inflammable.

This invention is an improvement in the method of manufacturing uninflammable celluloid, which consists in adding camphor to rosin; heating the mixture in a closed vessel to form solid solution by converting it into a sticky matter; mixing it with the product obtained by boiling floss silk, other silk or like fibre in dilute alkali solution so as to swell and glutinize it, suspending it homogeneously in alcohol or ether and mixing it intimately with magnesium carbonate or magnesium oxide; and then heating the above mixture for many hours, thus saponifying portion of rosin and forming magnesium resinate and at the same time glutinizing the fibre completely into a state of colloidal solution and then kneading the same with a roller or the like so as to distribute it homogeneously and thus obtaining very economically the product rich in lustre and transparency, incollapsible, elastic and uninflammable, softened in a sticky condition to be easily molded, when heated, and hard to catch fire; in short, obtaining such product as has the merit, but no fault of the ordinary celluloid.

According to the present invention, camphor together with rosin forms solid solution and gives elasticity, flexibility, plasticity and lustre to the product. The glutinized silk fibre increases the toughness of the product considerably. Further, magnesium carbonate or magnesium oxide saponifies portion of rosin to make the product waterproof and also together with the glutinized silk fibre strengthens the fireproofing nature of the product so that it does not become sticky even if it is subject to high temperature.

The following is an example of carrying this invention into practice:—

Add 35 parts of camphor to 65 parts of rosin and heat and fuse the mixture in a closed vessel at 130°–180° C. into a sticky condition to form solid solution. Mix therewith the product obtained by boiling 20 parts of waste floss silk, other silk or like fibre in 2% of caustic soda solution for some time so as to swell and glutinize the fibre, suspending the same homogeneously in alcohol and adding thereto 80 parts of magnesium carbonate. Heat it for nearly 48 hours not only to saponify portion of rosin, but to convert the fibre into a state of colloidal solution, adding pigment or other coloring matter if necessary. Then, knead it with a roller heated at about 70° C. and give it a thin plate or other suitable shape.

Claim.

Method of manufacturing celluloid substitute, characterized by adding camphor to rosin, heating the mixture in a closed vessel to fuse it in a sticky condition; mixing the same with the product obtained by boiling floss-silk, other silk or like fibre in dilute alkali solution so as to swell and glutinize it, suspending the same homogeneously in alcohol or ether and mixing it intimately with magnesium carbonate or magnesium oxide; and then heating and kneading the mixture homogeneously.

In testimony whereof I have affixed my signature.

MOTOMU SUGATA.